March 17, 1953 W. S. DRUZ 2,632,049

SIGNAL SLICING CIRCUITS

Filed June 18, 1949 2 SHEETS—SHEET 1

WALTER S. DRUZ
*INVENTOR.*

BY Francis W. Crotty

HIS ATTORNEY

March 17, 1953 W. S. DRUZ 2,632,049

SIGNAL SLICING CIRCUITS

Filed June 18, 1949 2 SHEETS—SHEET 2

WALTER S. DRUZ.
*INVENTOR.*

BY Francis W. Crotty

HIS ATTORNEY

Patented Mar. 17, 1953 2,632,049

UNITED STATES PATENT OFFICE 2,632,049

SIGNAL SLICING CIRCUITS

Walter S. Druz, Chicago, Ill., assignor to Zenith Radio Corporation, a corporation of Illinois Application June 18, 1949, Serial No. 99,999

7 Claims. (Cl. 178—7.3)

This invention relates to signal slicing circuits in which double clipping is effected in a single stage.

Throughout the specification, and in the appended claims, the term "slicing" is utilized to describe the operation of double clipping in a single stage. More particularly, the term is used to describe the operation of producing in a single stage an output signal which corresponds only to an intermediate amplitude-portion of the input signal.

In the reception of composite television signals comprising video-signal components representing picture information and synchronizing-signal pulses representing the timing of the horizontal and vertical scansions at the transmitter, it is necessary to provide means at the receiver for separating the synchronizing-signal pulses from the video-signal components. In order to obtain true synchronization of the receiver with the transmitter, it is desirable to subject the detected composite video signal to a double clipping operation, so that the output pulses from the synchronizing-signal separator correspond to an intermediate amplitude-portion or slice of the synchronizing-signal components of the composite video signal. The desired double clipping operation is accomplished, in conventional television receivers, by cascading a bottom clipping circuit and a top clipping circuit with a subsequent synchronizing-signal amplifying stage. The bottom clipper separates the synchronizing-signal components from the video-signal components of the composite video signal, and the top clipper removes extraneous noise pulses from the separated synchronizing-signal pulses.

It is an important object of the present invention to provide a signal slicing circuit which effectively performs double clipping in a single stage.

It is another object of the invention to provide a circuit for operating on a varying unidirectional input signal, as for example a detected composite video signal, to provide a substantially constant output signal which corresponds only to an intermediate amplitude-portion of the input signal.

It is a further important object of the invention to provide a single stage synchronizing-signal slicing circuit for obtaining from detected composite video signals a series of output voltage pulses of substantially constant amplitude and of a repetition frequency corresponding to that of the incoming synchronizing-signal pulses.

Another object of the invention is to provide a single stage synchronizing-signal slicing circuit utilizing a conventional pentagrid converter tube.

The present invention provides a signal slicing circuit which comprises an electron-discharge device having in the order named a cathode, a control electrode, an accelerating electrode, an input electrode, and an anode, and having an anode current vs. input electrode voltage characteristic comprising two voltage ranges of substantially zero transconductance separated by a voltage range of high transconductance. A source of varying unidirectional input signals, recurring at a predetermined frequency, is coupled to the input electrode and to the cathode by means of an input circuit comprising an energy storage device and additionally comprising resistance means coupled between the input electrode and the cathode. The time constant of the energy storage device and the resistance means is made at least as long as the period of the input signal recurrence frequency. An output circuit is coupled to the electron-discharge device for developing output signals which correspond to an intermediate amplitude-portion of the input signals. A feedback network is coupled from the output circuit to the control electrode and to the cathode for supplying a portion of the output signals to the control electrode in degenerative phase with respect to the input signals.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
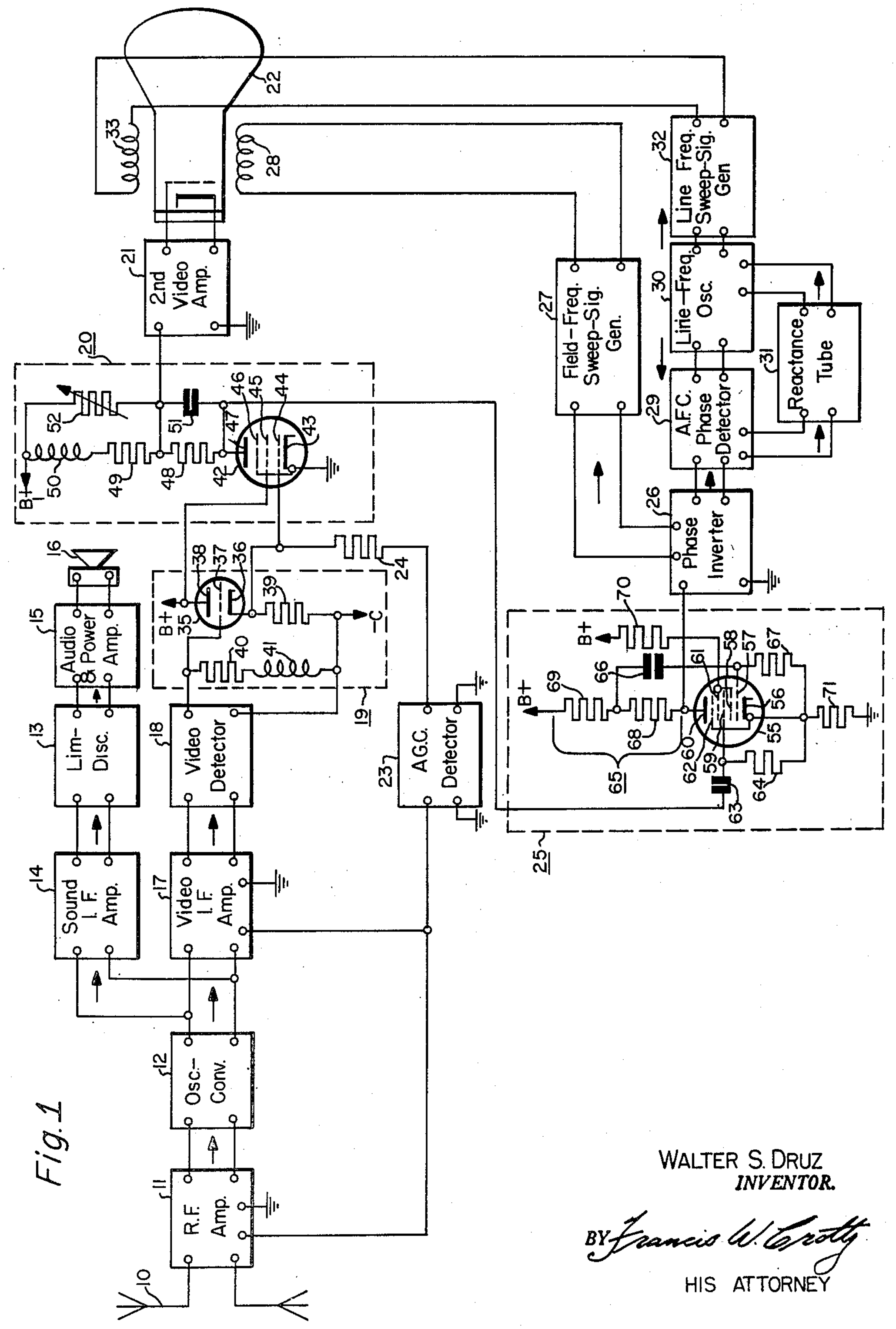
Figure 1 is a schematic diagram of a television receiver embodying the present invention.

Figure 1 is a schematic block diagram of an exemplary television receiver in which the present invention may be utilized to advantage; it is to be clearly understood that the invention is not to be limited in its application to receivers of the type shown in Figure 1, but that it may be utilized to advantage in other types of television receivers, as for example, a television receiver of the inter-carrier sound type, or in any other apparatus in which it is desired to derive an output signal which corresponds to an intermediate amplitude-portion of a varying unidirectional input signal.

In the receiver of Figure 1, the incoming composite television signal is intercepted by an antenna 10, amplified by one or more stages of radio-frequency amplification 11, and applied to an oscillator-converter 12 where it is heterodyned with locally generated oscillations to provide intermediate-frequency video and sound signals. The intermediate-frequency sound signals from the output of oscillator-converter 12 are limited and detected by a limiter-discriminator 13 after passing through one or more stages of intermediate-frequency amplification 14, and the audio-frequency output from limiter-discriminator 13 is amplified by audio-frequency and power amplifier stages 15 and applied to a loudspeaker 16 or other sound-reproducing device.

The intermediate-frequency video signal from the output of oscillator-converter 12 is amplified by one or more stages of video intermediate-frequency amplification 17 and demodulated by a video detector 18.

The detected composite video signal from the output of video detector 18 is passed through a noise clipping stage 19, a first video amplifier 20, and a second video amplifier 21 to the input circuit of a cathode ray tube or other image-reproducing device 22. Noise clipping stage 19 is coupled to an AGC (automatic gain control) detector 23 by means of a resistor 24, and the rectified and integrated AGC potential from AGC detector 23 is applied to amplifying stages 11 and 17 in a well-known manner.

The amplified composite video signal from the output of first video amplifier 20 is supplied to a synchronizing-signal slicing circuit 25, the construction and operation of which are hereinafter described in detail. Synchronizing-signal slicing circuit 25 operates to provide output voltage pulses of substantially constant amplitude, which pulses correspond to an intermediate amplitude-portion of the synchronizing-signal pulse components of the composite video signal. The output pulses from synchronizing-signal slicing circuit 25 are passed through a phase inverter 26. Field-frequency pulses from phase inverter 26 are used to drive a field-frequency sweep-signal generator 27 which supplies a suitable scanning signal to the appropriate deflection coils 28 associated with image-reproducing device 22.

Line-frequency output pulses from phase inverter 26 are supplied to an AFC (automatic frequency control) phase detector 29, where they are compared in phase with a signal from a local line-frequency oscillator 30. The output from AFC phase detector 29 is applied to the grid of a reactance tube 31 which controls the frequency of line-frequency oscillator 30. A line-frequency sweep-signal generator 32, driven by line-frequency oscillator 30, supplies a suitable scanning signal to the appropriate deflection coils 33 associated with image-reproducing device 22.

While the illustrated receiver utilizes the line-frequency output pulses from synchronizing-signal slicing circuit 25 to provide automatic frequency control of the line-frequency oscillator, the invention is not to be limited to such an arrangement. For example, the line-frequency output pulses from phase inverter 26 may be utilized directly to drive the line-frequency sweep-signal generator 32.

Except for units 19, 20 and 25, which are to be considered further hereinafter, the several components of the receiver of Figure 1 may be of any well-known design and construction, and the operation of the receiver is entirely conventional except for the manner in which synchronizing-signal separation is obtained. The manner of obtaining synchronizing-signal separation will now be described in detail.

Noise clipping stage 19 comprises an electron-discharge device 35 having a cathode 36, a control grid 37, and an anode 38. Cathode 36 is coupled to a suitable source of negative unidirectional operating potential —C by means of a load resistor 39. Control grid 37 is connected to the output of video detector 18 and is coupled to —C by means of a resistor 40 and an inductor 41. Anode 38 is directly connected to a suitable source B+ of positive unidirectional operating potential.

First video amplifier 20 comprises an electron-discharge device 42 having a cathode 43, a control grid 44, a screen grid 45, a suppressor grid 46, and an anode 47. Cathode 43 is directly connected to ground. Control grid 44 is connected to cathode 36 of device 35. Screen grid 45 is directly connected to B+, and suppressor grid 46 is directly connected to cathode 43. Anode 47 is coupled to another operating-potential source $B_1+$ by means of an output circuit comprising series-arranged resistors 48 and 49 and a peaking coil 50; resistor 48 is bypassed for the higher-frequency video-signal components by means of a condenser 51, and a variable resistor 52 is connected in shunt with the series combination of resistor 49 and peaking coil 50. Amplified composite video signals appearing across the network comprising resistors 49 and 52 and peaking coil 50 are applied to the circuit of second video amplifier 21, which is preferably arranged to provide synchronizing-signal peak stabilization by grid current conduction in its input circuit in well-known manner.

Synchronizing-signal slicing circuit 25 comprises an electron-discharge device 55 having in the order named a cathode 56, a control electrode 57, an accelerating electrode 58, an input electrode 59, and an anode 60. Preferably, a second accelerating electrode 61 is provided between input electrode 59 and anode 60; a suppressor electrode 62, internally connected to cathode 56, may be provided between second accelerating electrode 61 and anode 60. Input electrode 59 is coupled to anode 47 of device 42 by means of a condenser or energy storage device 63, and a resistor 64 is coupled between input electrode 59 and cathode 56. The output circuit for device 55 comprises a load impedance 65 coupled between anode 60 and B+. A feedback network, comprising a condenser 66 coupled between load impedance 65 and control electrode 57, and a resistor 67 connected getween control electrode 57 and cathode 56, is provided for supplying a portion of the output signals developed across load impedance 65 to control electrode 57. In the illustrated embodiment, load impedance 65 is shown as comprising a pair of series-connected resistors 68 and 69, and condenser 66 is coupled from a point intermediate resistors 68 and 69 to control electrode 57. As an alternative, load impedance 65 may comprise a single impedance element having a tap to which condenser 66 is connected. Accelerating electrodes 58 and 61 are coupled to B+ by means of a voltage-dropping resistor 70; accelerating electrodes 58 and 61 are preferably not bypassed to ground or to cathode 56. Cathode 56 is connected to ground by impedance means, here shown as a resistor 71.

In operation, composite video signals from video detector 18 are applied to control grid 37 of device 35, and detector 18 is so constructed and arranged that the signal applied to grid 37 comprises synchronizing-signal pulses which are negatively oriented with respect to the video-signal components. The value of the positive unidirectional operating potential B+ applied to anode 38 is so adjusted that, in the maximum signal condition the space current in device 35 is cut off at a point slightly more negative than the peaks of the synchronizing-signal pulses. Noise clipping is then accomplished by anode-current cutoff. Since noise clipper stage 19 is arranged with the output load 39 in the cathode lead, output signals applied to control grid 44 of device 42 are of the same polarity as the signals applied to control grid 37 of device 35.

Because the output of video detector 18 is passed through a noise clipper 19, first video amplifier stage 20 may be adjusted for maximum gain. To this end, the value of negative biasing potential source −C is adjusted so that control grid 44 of device 42 is biased to a linear region of its transfer characteristic in the absence of an incoming signal. Because noise clipping stage 19 is direct-coupled to first video amplifier 20, operation of device 42 in its maximum transconductance range, independently of variations in the video-signal components, is assured.

The output circuit of first video amplifier 20 is arranged so that the contrast of the image reproduced on the screen of image-reproducing device 22 may be reduced to zero, if desired, without causing the receiver to fall out of synchronism with the received composite television signals. For this purpose, a split load impedance comprising resistors 48 and 49 and peaking coil 50 is utilized, and the composite video signals to be applied to second video amplifier 21 are derived from resistor 49 and peaking coil 50, shunted by contrast-control resistor 52, while the composite video signals to be applied to the synchronizing-signal slicing circuit 25 are derived from the entire load impedance. This arrangement is substantially the same as that disclosed and claimed in the copending application of Richard O. Gray, Serial No. 60,844, filed November 19, 1948, for "Television Receiver Contrast Control Circuits," and assigned to the same assignee as the present application, now abandoned. As previously explained, condenser 51 is shunted across resistor 48 to bypass the higher-frequency video-signal components so that those components are attenuated in the composite video signals applied to the input circuit of the synchronizing-signal slicing arrangement 25.

As previously mentioned, second video amplifier 21 is preferably constructed and arranged to provide synchronizing-signal peak stabilization by grid current conduction. The use of noise clipping stage 19 is particularly advantageous in connection with a second video amplifier of this construction. If noise clipping were not provided, large noise bursts superimposed on the incoming composite television signals would cause the bias on the input grid of the second video amplifier to become instantaneously more negative, thereby effectuating disconcerting white flashes on the screen of image-reproducing device 22. By providing noise clipping stage 19, such noise bursts are prevented from deleteriously affecting the operation of second video amplifier 21.

Composite video signals appearing between anode 47 of device 42 and ground are applied to the input circuit of the synchronizing-signal slicing arrangement 25 with the synchronizing-signal pulses positively oriented with respect to the video-signal components. Synchronizing-signal slicing circuit 25 operates on the incoming composite video signals to produce a series of output pulses of substantially constant amplitude, and occurring at the frequency of the synchronizing-signal pulses, in a manner which may best be understood by a consideration of the graphical representation of Fig. 2.

Figure 2:
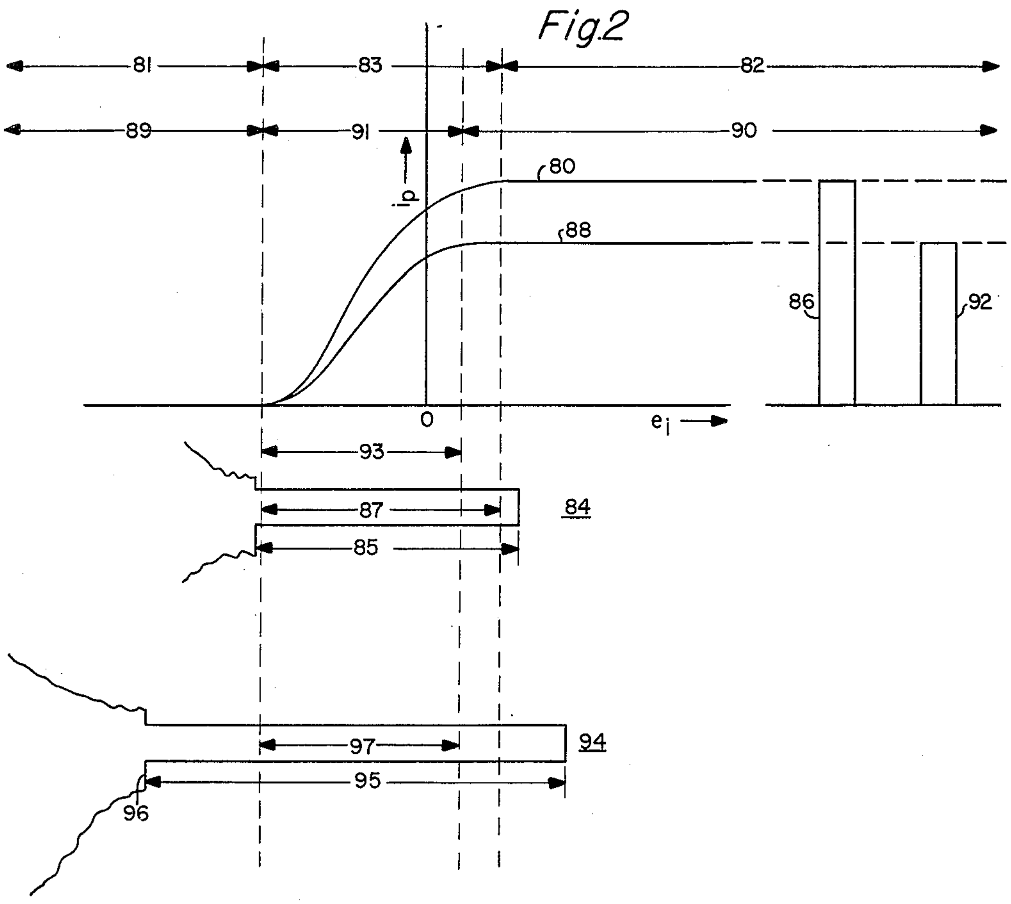
Figure 2 is a graphical representation which is useful in explaining the operation of the invention.

Figure 2 represents the anode current $i_p$ vs. input electrode voltage $e_1$ characteristic of a device of the type in which the input electrode follows an accelerating electrode in the path of the space electrons. More particularly, curve 80 represents the operating characteristic of device 55, when connected as shown in Figure 1, in the absence of an incoming composite video signal. Characteristic 80 comprises two input electrode voltage ranges 81 and 82 of substantially zero transconductance separated by a voltage range 83 of high transconductance. In the absence of the degenerative feedback network comprising condenser 66 and resistor 67 from the output circuit to control electrode 57, curve 80 represents the operating characteristic of the device, and in the presence of incoming composite video signals 84 of sufficient amplitude so that the synchronizing-signal pulses 85 span high-transconductance voltage range 83, both transconductance cutoffs are utilized and the pulses 86 developed in the output circuit are of substantially constant amplitude and correspond to an intermediate amplitude-portion 87 of the incoming synchronizing-signal pulses 85.

In the presence of the feedback network comprising condenser 66 and resistor 67, a portion of the output signals is supplied in degenerative phase to control electrode 57, thereby reducing the gain of device 55 during the synchronizing-signal pulse intervals and altering the characteristic as shown in Figure 2 as curve 88. It is observed that the altered characteristic 88 also comprises two input electrode voltage ranges 89 and 90 of substantially zero transconductance separated by a voltage range 91 of high transconductance, but the width of high-transconductance voltage range 91 is less than that of range 83. Thus, output pulses 92 of lesser amplitude are produced, and the output pulses 92 correspond to a thinner slice 93 of the incoming synchronizing-signal pulses.

By providing resistor 71 in the cathode lead of device 55, and by returning control electrode 57 to the cathode, the potential of cathode 56 is made to follow that of control electrode 57; alternatively, the same action may be obtained by returning control electrode 57 to ground and applying a small positive biasing voltage to control electrode 57 to insure zero bias of control electrode 57 relative to cathode 56. Since resistor 71 is included in the input circuit but is exclusive of the feedback network, a feedback potential is developed across resistor 71 in the input circuit during synchronizing-signal pulse intervals, and this feedback potential is in regenerative phase with the incoming synchronizing-signal pulses. As a result, the incoming composite video signal 84 is effectively expanded as shown at 94 in Figure 2. The amplitude 95 of the resultant synchronizing-signal pulses with respect to the blanking pedestal 96 is thus increased, while the video-signal components are unaffected. Thus, the output voltage pulses 92 correspond to a still thinner intermediate amplitude-portion 97 of the incoming synchronizing-signal pulses. Because the resultant signal 94 at input electrode 59 causes a larger amount of input electrode current to be drawn, and because resistor 71 is regenerative only during the synchronizing-signal pulse intervals, intermediate amplitude-portion 97 is positioned farther from the peak of the synchronizing-signal pulse as increased by regeneration, but also farther from the blanking pedestal 96, thereby providing improved noise rejection characteristics.

Because the amplitude of the output pulses is independent of the input signal amplitude above a predetermined threshold, the amplitude of the signal developed across resistor 71, and hence the amount of regeneration, is constant for signals of greater amplitude than this threshold value. Therefore a greater proportional amount of regenerative feedback is automatically provided for weak signals than for strong ones. This also results in improved noise rejection characteristics.

In accordance with another feature of the invention, accelerating electrode 58 is preferably returned to B+ through an unbypassed load resistor 70. This arrangement is particularly advantageous when the input signal from first video amplifier 20 is so weak that the synchronizing-signal pulses fail to span high-transconductance range 83. Under such conditions, the potential of accelerating electrode 58 is permitted to increase as the effective input signal at input grid 59 increases due to the regenerative action of resistor 71, thereby increasing the amount of regeneration. This effect is cumulative to the point that the effective signal at the input grid 59 builds up to such an amplitude that double-clipping is attained. For even weaker input signals, bottom clipping is accomplished by anode-current cutoff, and noise limiting is achieved by anode-current saturation.

Merely by way of illustration and in no sense by way of limitation, satisfactory operation has been obtained by using the following component values for the circuit elements of units 19, 20 and 25 of the receiver of Figure 1:

| | |
|---|---|
| Electron discharge device 35 | 1 section of a type 6SL7 tube |
| Electron discharge device 42 | Type 6AU6 |
| Electron discharge device 55 | Type 6SB7Y |
| Resistor 39 | 18,000 ohms |
| Resistor 40 | 3,900 ohms |
| Resistor 48 | 7,500 ohms |
| Resistor 49 | 820 ohms |
| Resistor 64 | 1.5 megohms |
| Resistor 67 | 220,000 ohms |
| Resistor 68 | 27,000 ohms |
| Resistor 69 | 8,200 ohms |
| Resistor 70 | 10,000 ohms |
| Resistor 71 | 560 ohms |
| Condenser 51 | 35 micro-microfarads |
| Condenser 63 | 0.1 microfarad |
| Condenser 66 | 0.01 microfarad |
| —C | —2.5 volts |
| B+ | 150 volts |
| $B_1+$ | 240 volts |

Figure 3:
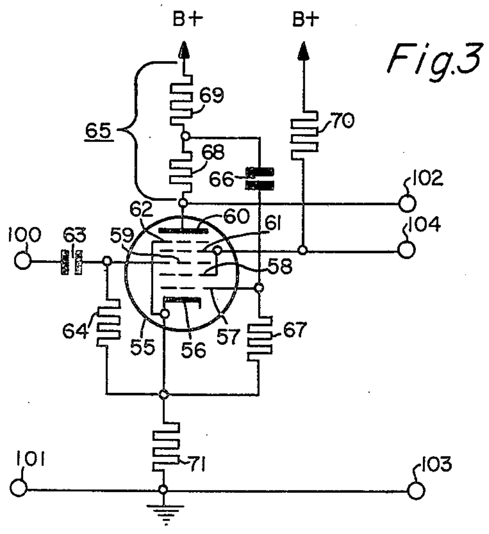
Figure 3 is a schematic diagram of another embodiment of the invention.

As a further embodiment of the invention, it is possible to derive output pulses of either polarity from a synchronizing-signal slicing circuit constructed in accordance with the present invention. Thus, in the arrangement of Figure 3, composite video signals having the synchronizing-signal pulses positively oriented with respect to the video-signal components, are applied between input terminals 100 and 101. Output signals 92 (Figure 2) are then developed across load impedance 65, as explained in connection with the embodiment of Figure 1. The pulses appearing across load impedance 65 are of negative polarity, and may be derived therefrom by means of output terminals 102 and 103. At the same time, because all space electrons which are not collected by anode 60 are collected by electrodes 58 and 61, it is possible by properly adjusting resistor 70 to derive positive polarity output pulses between output terminals 104 and 103, terminal 104 being connected to accelerating electrodes 58 and 61. Thus, it is possible to eliminate the necessity for phase inverter stage 26 of the receiver of Figure 1 by deriving the output voltage pulses only from terminals 104 and 103.

In summary the invention provides a novel signal slicing circuit for effectively providing double clipping in a single stage, the circuit incorporating a conventional readily available electron-discharge device. The invention is particularly adaptable to synchronizing-signal separation in a television receiver, and the noise rejection accomplished by the use of the invention is materially better than that obtainable by more complicated prior-art arrangements for accomplishing the same results. However, it is to be clearly understood that the invention is not to be limited to application in television synchronizing-signal separation, but may also find advantageous use in the reception of pulse-time modulated signals of the type wherein the desired signal is represented by the variation in timing of individual pulses in a recurrent series of pulses, and in fact, in any application in which it is desired to provide an output signal corresponding only to an intermediate amplitude-portion of an input signal.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A signal slicing circuit comprising: an electron-discharge device having in the order named a cathode, a control electrode, an accelerating electrode, and input electrode, and an anode, and having an anode current vs. input electrode voltage characteristic comprising two voltage ranges of substantially zero transconductance separated by a voltage range of high transconductance; a source of varying unidirectional input signals recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; an output circuit coupled to said electron discharge device for developing output signals corresponding to an intermediate amplitude-portion of said input signals; an aperiodic feedback network; means whereby said network is coupled from said output circuit to said control electrode and to said cathode to supply a portion of said output signals to said control electrode in degenerative phase with respect to said input signals.

2. A signal slicing circuit comprising: an electron-discharge device having in the order named a cathode, a control electrode, an accelerating electrode, an input electrode, and an anode, and having an anode current vs. input electrode voltage characteristic comprising two voltage ranges of substantially zero transconductance separated by a voltage range of high transconductance; a source of varying unidirectional input signals recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; an output circuit coupled to said electron-discharge device for developing output signals corresponding to an intermediate amplitude-portion of said input signals; an aperiodic feedback network; means whereby said network is coupled from said output circuit to said control electrode and to said cathode to supply a portion of said output signals to said control electrode in degenerative phase with respect to said input signals; and impedance means included in said input circuit but exclusive of said feedback network for developing a feedback potential in said input circuit in regenerative phase with respect to said input signals.

3. A synchronizing-signal slicing circuit comprising: an electron-discharge device having in the order named, a cathode, a control electrode, an accelerating electrode, an input electrode, and an anode, and having an anode current vs. input electrode voltage characteristic comprising two voltage ranges of substantially zero transconductance separated by a voltage range of high transconductance; a source of composite video signals including video-signal components and also including synchronizing-signal pulses positive relative to said video-signal components and recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; a load impedance coupled to said anode and to said cathode for developing output signals corresponding to an intermediate amplitude-portion of said synchronizing-signal pulses; an aperiodic feedback network; means whereby said network is coupled from said load impedance to said control electrode and to said cathode to supply a portion of said output signals to said control electrode in degenerative phase with respect to said synchronizing-signal pulses; and impedance means included in said input circuit but exclusive of said feedback network for developing a feedback potential in said input circuit in regenerative phase with respect to said synchronizing-signal pulses.

4. A synchronizing-signal slicing circuit comprising: an electron-discharge device having in the order named, a cathode, a control electrode, an accelerating electrode, an input electrode, and an anode, and having an anode current vs. input electrode voltage characteristic comprising two voltage ranges of substantially zero transconductance separated by a voltage range of high transconductance; a source of composite video signals including video-signal components and also including synchronizing-signal pulses positive relative to said video-signal components and recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; a first load impedance coupled to said anode and to said cathode for developing a first set of output signals corresponding to an intermediate amplitude-portion of said synchronizing-signal pulses; a second load impedance coupled to said accelerating electrode and to said cathode for developing a second set of output signals of opposite phase with respect to said first set of output signals; an aperiodic feedback network; means whereby said network is coupled from said first load impedance to said control electrode and to said cathode to supply a portion of said first set of output signals to said control electrode in degenerative phase with respect to said synchronizing-signal pulses; and impedance means included in said input circuit but exclusive of said feedback network for developing a feedback potential in said input circuit in regenerative phase with respect to said synchronizing-signal pulses.

5. A synchronizing-signal slicing circuit comprising: an electron-discharge device having in the order named, a cathode, a control electrode, an accelerating electrode, an input electrode, and an anode, and having an anode current vs. input electrode voltage characteristic comprising two voltage ranges of substantially zero transconductance separated by a voltage range of high transconductance; a source of composite video signals including video-signal components and also including synchronizing-signal pulses positive relative to said video-signal components and recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; an output circuit coupled to said anode and to said cathode for developing output signals corresponding to an intermediate amplitude-portion of said synchronizing-signal pulses; unbypassed means for applying a positive unidirectional operating potential to said accelerating electrode; an aperiodic feedback network; means whereby said network is coupled from said output circuit to said control electrode and to said cathode to supply a portion of said output signals to said control electrode in degenerative phase with respect to said synchronizing-signal pulses; and impedance means included in said input circuit but exclusive of said feedback network for developing a feedback potential in said input circuit in regenerative phase with respect to said synchronizing-signal pulses.

6. A synchronizing-signal slicing circuit comprising: an electron-discharge device having in the order named, a cathode, a control electrode, an accelerating electrode, an input electrode, and an anode, and having an anode current vs. input electrode voltage characteristic comprising two voltage ranges of substantially zero transconductance separated by a voltage range of high transconductance; a source of composite video signals including video-signal components and also including synchronizing-signal pulses positive relative to said video-signal components and recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; an output circuit coupled to said electron-discharge device for developing output signals corresponding to an intermediate amplitude-portion of said synchronizing-signal pulses; an aperiodic feedback network comprising a condenser and a resistor; means whereby said condenser is coupled from said output circuit to said control electrode and said resistor is coupled between said control electrode and said cathode to supply a portion of said output signals to said control electrode in degenerative phase with respect to said synchronizing-signal pulses; and impedance means included in said input circuit but exclusive of said feedback network for developing a feedback potential in said input circuit in regenerative phase with respect to said synchronizing-signal pulses.

7. A synchronizing-signal slicing circuit comprising: an electron-discharge device having in the order named, a cathode, a control electrode, an accelerating electrode, an input electrode, and an anode, and having an anode current vs. input electrode voltage characteristic comprising two voltage ranges of substantially zero transconductance separated by a voltage range of high transconductance; a source of composite video signals including video-signal components and also including synchronizing-signal pulses positive relative to said video-signal components and recurring at a predetermined frequency; an input circuit comprising an energy storage device coupling said source to said input electrode and to said cathode and further comprising resistance means coupled between said input electrode and said cathode and providing with said energy storage device a time constant at least as long as the period of said predetermined frequency; an output circuit coupled to said electron-discharge device for developing output signals corresponding to an intermediate amplitude-portion of said synchronizing-signal pulses; an aperiodic feedback network comprising a condenser and a resistor; means whereby said condenser is coupled from said output circuit to said control electrode and said resistor is connected between said control electrode and said cathode to supply a portion of said output signals to said control electrode in degenerative phase with respect to said synchronizing-signal pulses; and a resistor included in said input circuit but exclusive of said feedback network for developing a feedback potential in said input circuit in regenerative phase with respect to said synchronizing-signal pulses.

WALTER S. DRUZ.

REFERENCES CITED

The following references are of record in the file of this patent:

UNITED STATES PATENTS

| Number | Name | Date |
|---|---|---|
| 2,177,723 | Kemp et al. | Oct. 31, 1939 |
| 2,431,577 | Moore | Nov. 25, 1947 |
| 2,509,975 | Janssen | May 30, 1950 |